United States Patent
Park et al.

(10) Patent No.: US 12,416,419 B2
(45) Date of Patent: Sep. 16, 2025

(54) VENTILATION APPARATUS

(71) Applicant: LG ELECTRONICS INC., Seoul (KR)

(72) Inventors: Janghee Park, Seoul (KR); Yongki Jeong, Seoul (KR); Jinwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 375 days.

(21) Appl. No.: 18/099,823

(22) Filed: Jan. 20, 2023

(65) Prior Publication Data
US 2024/0035688 A1 Feb. 1, 2024

(30) Foreign Application Priority Data
Aug. 1, 2022 (KR) .......................... 10-2022-0095434

(51) Int. Cl.
| | |
|---|---|
| F24F 12/00 | (2006.01) |
| F24F 7/08 | (2006.01) |
| F24F 11/00 | (2018.01) |
| F24F 11/30 | (2018.01) |
| F24F 11/79 | (2018.01) |
| F24F 13/10 | (2006.01) |
| F24F 13/20 | (2006.01) |

(52) U.S. Cl.
CPC ..................................... *F24F 7/08* (2013.01)

(58) Field of Classification Search
CPC ...... F24F 12/006; F24F 11/0008; F24F 11/79; F24F 11/30; F24F 7/08; F24F 12/00; F24F 13/20; F24F 13/10

USPC ......................................................... 454/252
See application file for complete search history.

(56) References Cited

U.S. PATENT DOCUMENTS

2007/0119586 A1 5/2007 Choi et al.

FOREIGN PATENT DOCUMENTS

| CN | 107143945 A | 9/2017 |
|---|---|---|
| CN | 212108901 U | 12/2020 |
| KR | 10-2007-0051220 A | 5/2007 |
| KR | 10-2007-0066268 A | 6/2007 |

(Continued)

OTHER PUBLICATIONS

English translation of KR 102282099 by PE2E Mar. 7, 2025.*
English translation of WO20200178988 by PE2E Mar. 7, 2025.*

*Primary Examiner* — Deming Wan
(74) *Attorney, Agent, or Firm* — Birch, Stewart, Kolasch & Birch, LLP

(57) ABSTRACT

A ventilation apparatus includes a housing having an outdoor air inlet, an outdoor air outlet, an indoor air inlet, and an indoor air outlet; a partition dividing an inner space of the housing into a ventilation space and an air conditioning space; a total heat exchange element inside the ventilation space and having four side edges respectively disposed to face four side surfaces of the housing; four partition walls configured to respectively connect the four side edges of the total heat exchange element and the four side surfaces of the housing to partition the ventilation space into an outdoor air discharge space, an indoor air inlet space, and an indoor air discharge space; guide ducts respectively provided in the outdoor air discharge space, the indoor air inlet space, and the indoor air discharge space; and a bypass duct branching from the guide duct provided in the indoor air inlet space.

19 Claims, 17 Drawing Sheets

(56) References Cited

FOREIGN PATENT DOCUMENTS

| | | | | |
|---|---|---|---|---|
| KR | 10-2012-0041382 A | 5/2012 | | |
| KR | 10-1578528 B1 | 12/2015 | | |
| KR | 10-1606922 B1 | 3/2016 | | |
| KR | 10-1669254 B1 | 10/2016 | | |
| KR | 10-2018-0135636 A | 12/2018 | | |
| KR | 10-2124364 B1 | 6/2020 | | |
| KR | 102282099 B1 * | 1/2021 | ................ | F24F 7/08 |
| KR | 10-2327427 B1 | 11/2021 | | |
| KR | 10-2022-0045405 A | 4/2022 | | |
| KR | 10-2388854 B1 | 4/2022 | | |
| KR | 10-2433289 B1 | 8/2022 | | |
| KR | 10-2467477 B1 | 11/2022 | | |
| WO | WO-2020178988 A1 * | 9/2020 | ......... | B01D 53/0438 |

* cited by examiner

VENTILATION APPARATUS

CROSS-REFERENCE TO RELATED APPLICATION

The present application claims the benefits of priority to Korean Patent Application No. 10-2022-0095434, filed on Aug. 1, 2022, of which is incorporated herein by reference in its entirety.

BACKGROUND

1. Field

The present disclosure relates to a ventilation apparatus.

2. Description of the Related Art

A ventilation apparatus is an apparatus for discharging indoor air to the outside and supplying fresh outdoor air to the indoor space, and the main component of the ventilation apparatus is a total heat exchange element that allows only heat exchange without mixing the discharged indoor air and the introduced outdoor air.

Recently, a complex ventilation apparatus capable of performing a cooling function in addition to a ventilation function through total heat exchange has emerged.

Korean Patent Registration No. 10-2124364 (Jun. 18, 2020) discloses a complex ventilation apparatus in which a refrigeration system that forms a cooling cycle using a refrigerant inside the ventilation apparatus is mounted.

In the ventilation apparatus disclosed in the prior art, the components for cooling and heating, that is, a compressor, a condenser (second heat exchanger), and an evaporator (first heat exchanger) are installed inside the ventilation apparatus, and a damper (defined as a second damper) is provided for rapid cooling in which discharged indoor air passes through the evaporator rather than the total heat exchange element and then flows back into the indoor space.

The conventional complex ventilation apparatus having the above-described structure has the following disadvantages.

First, since both the evaporator and the compressor are provided inside the ventilation apparatus, there is a disadvantage in that a supply fan and an exhaust fan of the ventilation apparatus have to be driven simultaneously in an operation mode in which a cooling cycle is driven. For example, when the indoor rapid cooling operation is performed by closing the first damper and opening the second damper while the cooling cycle is driven, the exhaust fan has to operate for cooling the condenser. In the indoor rapid cooling operation mode, the outdoor air introduced by the operation of the exhaust fan has to be bypassed without passing through the total heat exchange element, so that heat is absorbed from the condenser and then discharged back to the outside through an exhaust discharge passage. To this end, a separate damper has to be provided to guide the introduced outdoor air to the exhaust discharge passage. As described above, when the compressor and the condenser are installed inside the ventilation apparatus, there is a disadvantage in that at least four dampers have to be provided.

Therefore, since the exhaust fan has to necessarily operate to cool the condenser in the rapid cooling mode, there is a disadvantage in that power consumption increases.

Second, since the heavy evaporator and compressor are all provided inside the ventilation apparatus, the volume and weight of the ventilation apparatus increase. Accordingly, there is a difficulty in installing the ventilation apparatus, and there is a risk of falling due to gravity after installation.

Third, if there is a problem in the operation of the compressor, there is a disadvantage in that the repair is not easy.

Fourth, since a passage for discharging contaminated indoor air directly to the outside without passing through the total heat exchange element is not provided inside the ventilation apparatus, there is a disadvantage in that the life of the total heat exchange element is shortened. For example, if fish or meat is cooked, indoor air containing odors and smoke passes through the total heat exchange element, and thus, animal fat with high viscosity is adsorbed on the surface of the total heat exchange element. This adsorption phenomenon increases the flow resistance of the exhausted indoor air and acts as a factor of lowering the total heat exchange efficiency with the introduced outdoor air.

Fifth, since the indoor air discharged to the outside has to pass through the total heat exchange element, the outdoor air passing through the total heat exchange element absorbs heat from the discharged indoor air when the indoor temperature is higher than the outdoor temperature. As a result, since fresh air with a relatively low temperature cannot be supplied to the indoor space, there is a disadvantage in that a user does not feel a ventilation effect in summer.

Sixth, in the prior art, since air is purified while the introduced outdoor air passes through the total heat exchange element and then passes through various filters, various contaminants including dust may be accumulated inside the total heat exchange element, and harmful bacteria may proliferate while being attached to the surface of the total heat exchange element.

Seventh, since it is not possible to install only a ventilation apparatus provided with a ventilation system or selectively combine an air conditioner provided with a cooling system in a state where a ventilation apparatus provided with a ventilation system is purchased, there is a disadvantage in that the range of product selection of consumers is narrow.

Eighth, in the case of the prior art, since it can be designed only for cooling as an integrated outdoor unit, there is a disadvantage in that it is difficult to implement a heating operation.

SUMMARY

The present disclosure is proposed to solve the above problems.

To achieve the above objects, a ventilation apparatus includes: a housing provided with a flange connector including an outdoor air inlet, an outdoor air outlet, an indoor air inlet, and an indoor air outlet; a partition configured to partition an inner space of the housing into a ventilation unit space at an upper side and an air conditioning unit space at a lower side; a total heat exchange element erected in a hexahedral shape inside the ventilation unit space and having four side edges respectively disposed to face four side surfaces of the housing; four partition walls configured to respectively connect the four side edges of the total heat exchange element and the four side surfaces of the housing to partition the ventilation unit space except a space for the total heat exchange element into an outdoor air inlet space, an outdoor air discharge space, an indoor air inlet space, and an indoor air discharge space; guide ducts respectively erected in the outdoor air discharge space, the indoor air inlet space, and the indoor air discharge space; a suction fan module disposed in the outdoor air discharge space and configured to supply outdoor air sucked through the outdoor air inlet into an indoor space; an exhaust fan module disposed in the indoor air discharge space and configured to discharge indoor air sucked through the indoor air inlet to an outside; and a bypass duct branching from a guide duct erected in the indoor air inlet space, bypassing the total heat exchange element, and extending to the indoor air discharge space.

The guide duct includes: an outdoor air discharge guide duct erected in the outdoor air discharge space; an indoor air inlet guide duct erected in the indoor air inlet space; and an indoor air discharge guide duct erected in the indoor air discharge space, wherein the bypass duct is branched from a side surface of the indoor air inlet guide duct.

The bypass duct is bent along an upper surface of the partition and an inner edge of the housing and communicates with the indoor air outlet.

The ventilation apparatus further includes a bypass damper module mounted at an inlet of the bypass duct.

The outdoor air inlet communicates with the outdoor air inlet space, the outdoor air outlet communicates with an upper surface of the outdoor air discharge guide duct, the indoor air inlet communicates with an upper surface of the indoor air inlet guide duct, and the indoor air outlet communicates with an upper surface of the indoor air discharge guide duct.

The ventilation apparatus further includes: a duct flange mounted on an upper surface of the housing and fixed to a position corresponding to the flange connector; and an air duct connected to the duct flange and extending upward from the housing.

The duct flange includes: an outdoor air inlet flange mounted at the outdoor air inlet; an outdoor air discharge flange mounted at the outdoor air outlet; an indoor air inlet flange mounted at the indoor air inlet; and an indoor air discharge flange mounted at the indoor air outlet.

The air duct includes: an outdoor air inlet duct coupled to the outdoor air inlet flange; an outdoor air discharge duct coupled to the outdoor air discharge flange; an indoor air inlet duct coupled to the indoor air inlet flange; and an indoor air discharge duct coupled to the indoor air discharge flange.

The ventilation apparatus further includes: a boundary wall configured to partition the air conditioning unit space into first and second spaces; a heat exchanger disposed in the first space; and an air conditioning fan module disposed in the second space.

The partition includes: an air conditioning inlet configured to connect the indoor air inlet guide duct and the first space; and an air conditioning outlet configured to connect the outdoor air discharge guide duct and the second space, and an air conditioning damper module is mounted at each of the air conditioning inlet and the air conditioning outlet.

A total heat exchange outlet is formed on a side surface of the indoor air inlet guide duct, a total heat exchange damper module is mounted at the total heat exchange outlet, and the total heat exchange damper module operates so that an inner space of the indoor air inlet guide duct and the indoor air inlet space selectively communicate with each other.

The ventilation apparatus further includes a filter module mounted on a side surface of the total heat exchange element communicating with the outdoor air inlet space and configured to purify introduced outdoor air, wherein the filter module includes at least one of a HEPA filter and a pre-filter.

The ventilation apparatus having the above-described configuration according to an embodiment of the present disclosure has the following effects.

First, the ventilation system and the air conditioning system are placed up and down, and the duct connection portion is formed on the upper surface of the ventilation apparatus. Accordingly, there is an advantage in that the ventilation apparatus can be installed in the stand form on the indoor floor. When installed in the stand form, there is an advantage in that the risk of falling is eliminated compared to when installed on the ceiling.

Second, since the air conditioning area is disposed below the ventilation area, the space of the ventilation area can be sufficiently secured. As a result, it is possible to increase the size of the total heat exchange element, there is an advantage in that ventilation performance is improved.

Third, since the condenser is not installed in the ventilation area, there is no need to drive the exhaust fan in the quick cooling mode which bypasses the indoor air to pass through the evaporator and then discharges the indoor air to the indoor space. Accordingly, there is an advantage in that power consumption is reduced.

Fourth, since only one of two heat exchangers constituting the cooling cycle is installed in the air conditioning area, there is an advantage in that the heat exchanger in the air conditioning area operates as an evaporator in the cooling mode through the operation of the four-way valve installed at the outlet of the compressor, and operates as a condenser in the heating mode.

Fifth, since the bypass passage is provided inside the ventilation apparatus so that the indoor air is discharged directly to the outside without passing through the total heat exchange element, there is an advantage in that the life of the total heat exchange element is prolonged by minimizing the contamination of the total heat exchange element.

Sixth, since it is possible to discharge the indoor air through the bypass passage, the introduced outdoor air can be supplied to the indoor space without recovering waste heat contained in the indoor air. Accordingly, there is an advantage in that ventilation performance and user satisfaction are improved.

Seventh, as outdoor air passes through various filters before the outdoor air is introduced into the total heat exchange element, foreign matters and harmful bacteria are filtered out in advance. Accordingly, there is an advantage in that the life of the total heat exchange element is prolonged.

Eighth, since the ventilation means including the total heat exchange element and the filters are provided in the form of a single module, there is an advantage of easy installation and repair.

Ninth, since the apparatus constituting the air conditioning system is detachably coupled to the lower side of the apparatus constituting the ventilation system in the form of a module, there is an advantage in that the range of product selection of consumers is widened.

DETAILED DESCRIPTION OF THE EMBODIMENTS

Hereinafter, a ventilation apparatus according to an embodiment of the present disclosure will be described in detail with reference to the accompanying drawings.

Figure 1:
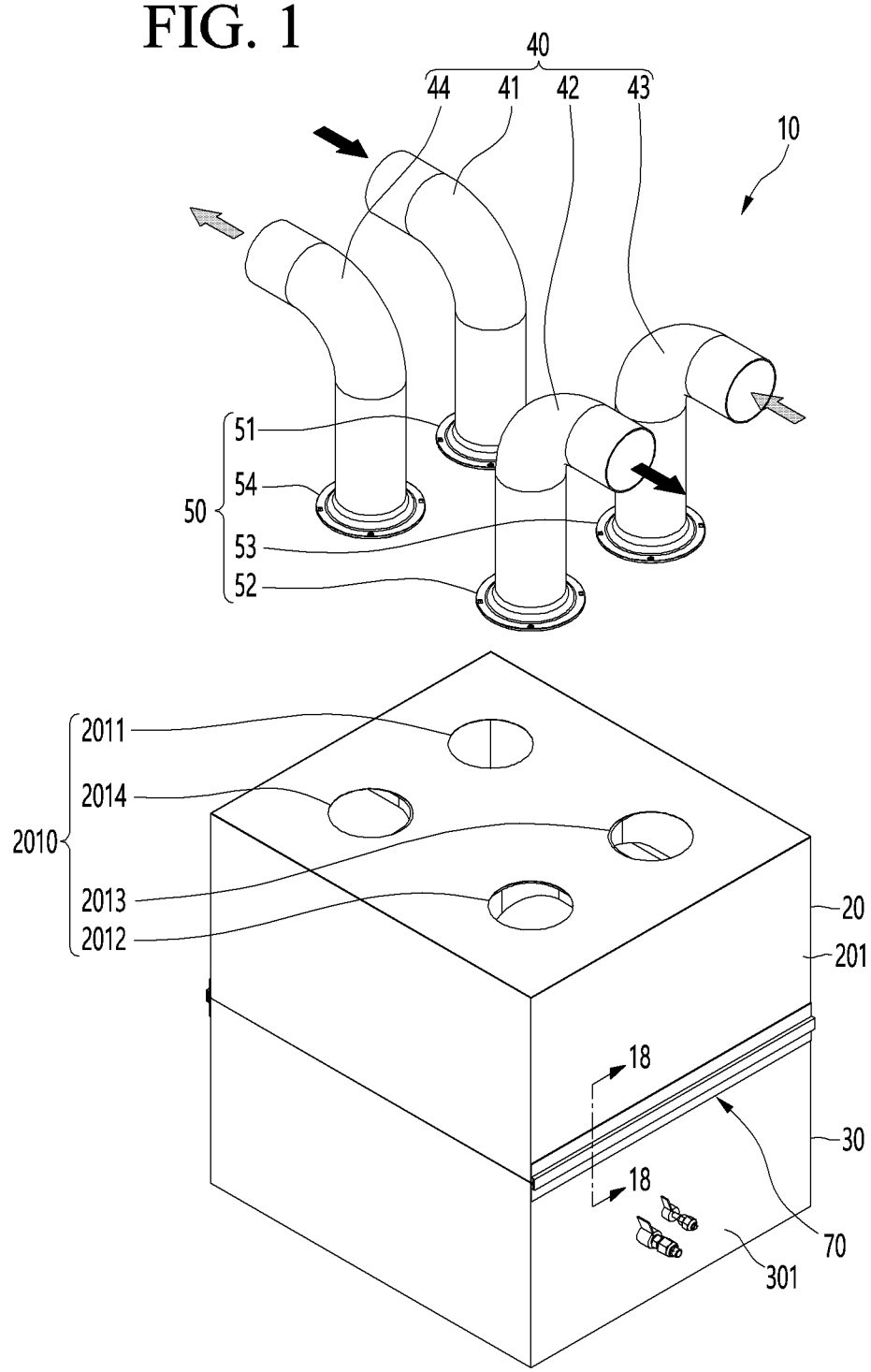
FIG. 1 is an external perspective view of a ventilation apparatus according to an embodiment of the present disclosure.
Figure 2:
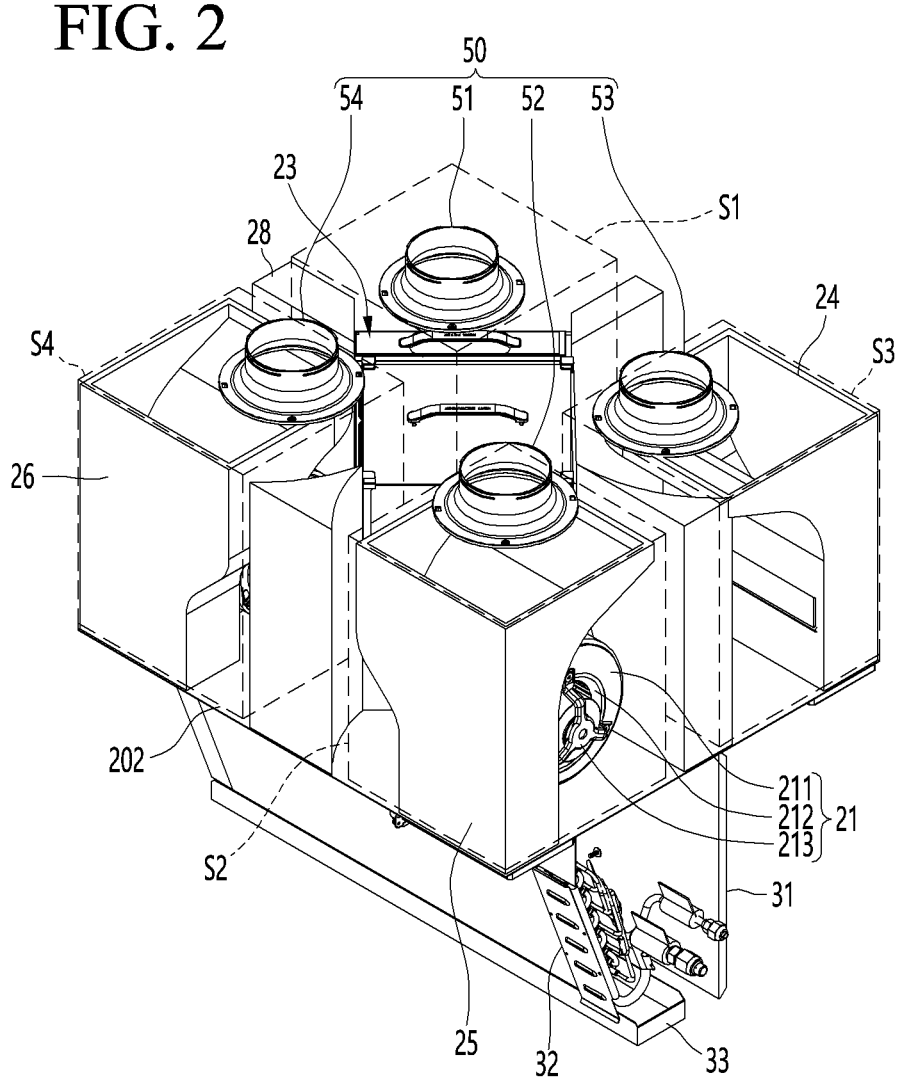
FIG. 2 is a perspective view showing the internal structure of the ventilation apparatus when viewed from a first side in a state in which a housing is removed.
Figure 3:
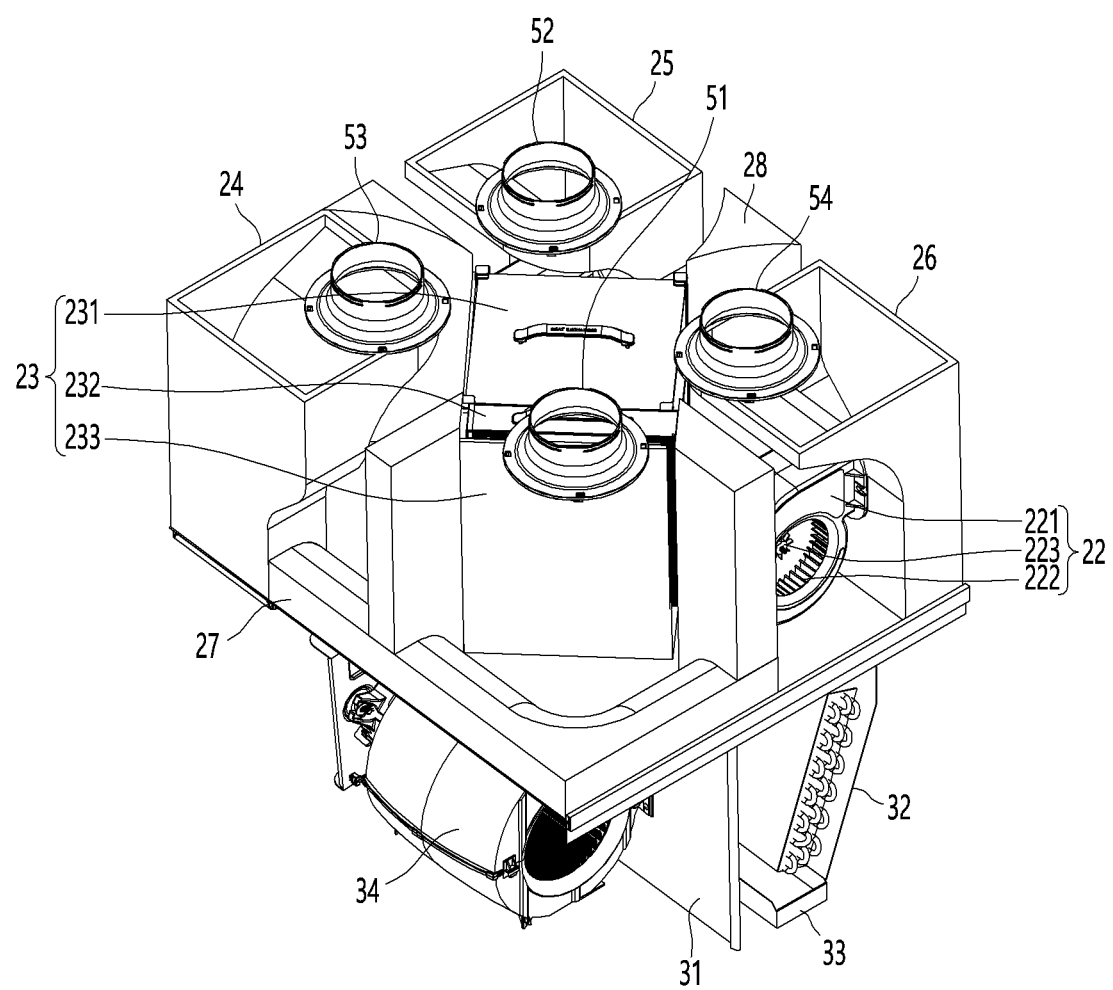
FIG. 3 is a perspective view showing the internal structure of the ventilation apparatus when viewed from a second side opposite to the first side in a state in which the housing is removed.
Figure 4:
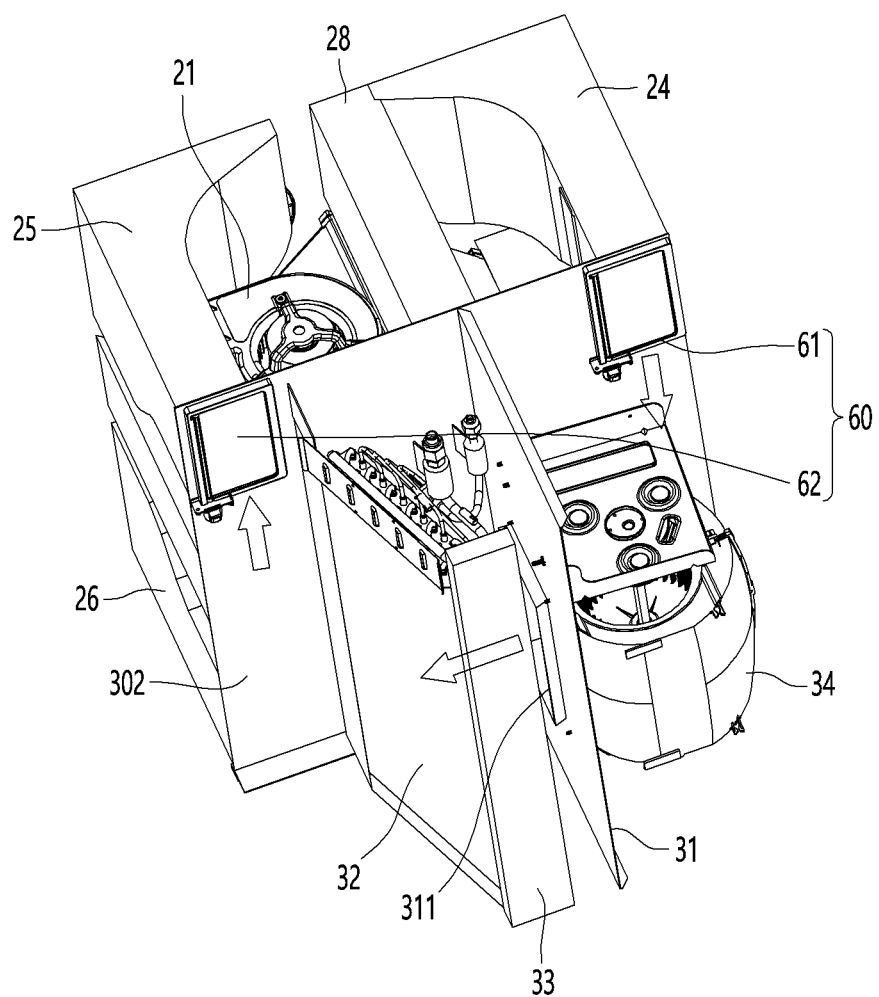
FIG. 4 is a bottom perspective view of the ventilation apparatus when viewed upward at the first side in a state in which the housing is removed.
Figure 5:
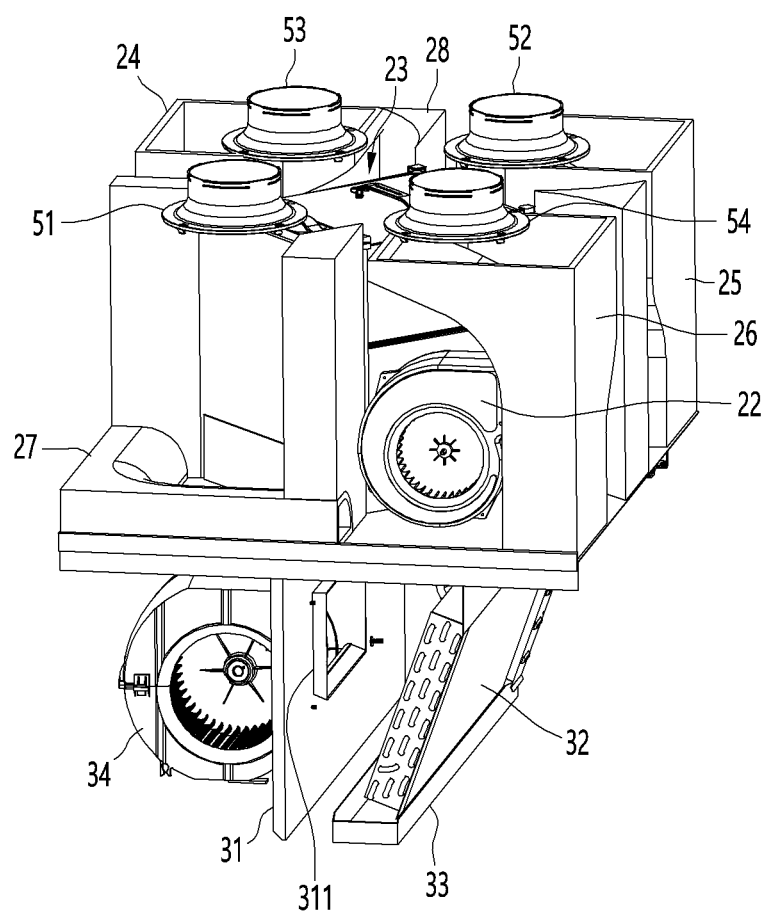
FIG. 5 is a bottom perspective view of the ventilation apparatus when viewed upward at the second side in a state in which the housing is removed.

FIG. 1 is an external perspective view of a ventilation apparatus according to an embodiment of the present disclosure, FIG. 2 is a perspective view showing the internal structure of the ventilation apparatus when viewed from a first side in a state in which a housing is removed, FIG. 3 is a perspective view showing the internal structure of the ventilation apparatus when viewed from a second side opposite to the first side in a state in which the housing is removed, FIG. 4 is a bottom perspective view of the ventilation apparatus when viewed upward at the first side in a state in which the housing is removed, and FIG. 5 is a bottom perspective view of the ventilation apparatus when viewed upward at the second side in a state in which the housing is removed.

Referring to FIGS. 1 to 5, a ventilation apparatus 10 according to an embodiment of the present disclosure includes a ventilation unit 10, an air conditioning unit 30 detachably coupled to the bottom surface of the ventilation unit 10, and a connection unit 70 connecting the air conditioning unit 30 to the ventilation unit 20.

The connection unit 70 connects both sides of a hexahedral upper housing 201 constituting the ventilation unit 20 and both sides of a hexahedral lower housing 301 constituting the air conditioning unit 30.

When the ventilation unit 20 and the air conditioning unit 30 are provided as non-separable types, the ventilation unit 20 and the air conditioning unit 30 may be accommodated in one large housing. Specifically, a partition that partitions the inner space of the housing up and down may be provided inside the housing, components constituting the ventilation unit 20 may be accommodated in the upper side of the partition, and components constituting the air conditioning unit 30 may be accommodated in the lower side of the partition. Communication holes, that is, an air conditioning inlet and an air conditioning outlet, which will be described later, may be formed in the partition, respectively.

In detail, the ventilation apparatus 10 further includes a duct flange 50 coupled to the upper surface of the ventilation unit 10, and an air duct 40 connected to the duct flange 50.

A flange connector 2010 is formed on the upper surface of the upper housing 201. An outdoor air inlet 2011, an outdoor air outlet 2012, an indoor air inlet 2013, and an indoor air outlet 2014 are formed in the flange connector 2010. The outdoor air inlet 2011 is formed at a position facing the outdoor air outlet 2012 in a diagonal direction, and the indoor air inlet 2013 is formed in a position facing the indoor air outlet 2014 in a diagonal direction.

The duct flange 50 is mounted to the flange connector 2010. The duct flange 50 includes an outdoor air inlet flange 51 connected to the outdoor air inlet 2011, an outdoor air discharge flange 52 connected to the outdoor air outlet 2012, an indoor air inlet flange 53 connected to the indoor air inlet 2013, and an indoor air discharge flange 54 connected to the indoor air outlet 2014.

The air duct 40 includes an outdoor air inlet duct 41 connected to the outdoor air inlet flange 51, an outdoor air discharge duct 42 connected to the outdoor air discharge flange 52, an indoor air inlet duct 43 connected to the indoor air inlet flange 53, and an indoor air discharge duct 44 connected to the indoor air discharge flange 54.

Meanwhile, the ventilation unit 20 further includes a ventilation module 23 disposed in the inner center of the upper housing 201.

The ventilation module 23 may include a total heat exchange element 231 that only exchanges heat without mixing indoor air and outdoor air, a HEPA filter 232 disposed on one side of the total heat exchange element 231, and a pre-filter 233 disposed on one side of the HEPA filter 232.

The total heat exchange element 231 has a hexahedral shape having upper and lower surfaces and four side surfaces. The four side surfaces include two side surfaces through which outdoor air passes and two side surfaces through which indoor air passes. An outdoor air passage and an indoor air passage cross each other inside the total heat exchange element 231. A passage through which outdoor air flows and a passage through which indoor air flows are alternately arranged in the height direction of the total heat exchange element 231.

One surface of the HEPA filter 232 is in close contact with the side surface through which outdoor air is introduced among the four side surfaces of the total heat exchange element 231, and the pre-filter 233 is in close contact with the other surface of the HEPA filter 232. Accordingly, outdoor air introduced through the outdoor air inlet duct 41 is purified while sequentially passing through the pre-filter 233 and the HEPA filter 232 and then passes through the total heat exchange element 231.

The four side surfaces of the total heat exchange element 231 are erected inside the upper housing 201 in a form facing each of the four corners of the upper housing 201. Four partition walls 28 are disposed between four side edges forming the total heat exchange element and four side surfaces of the upper housing 201. Accordingly, a space inside the upper housing 201 excluding a space occupied by the total heat exchange element 231 is partitioned into four spaces by the four partition walls 28.

The four partitioned spaces are defined as an outdoor air inlet space S1, an outdoor air discharge space S2, an indoor air inlet space S3, and an indoor air discharge space S4.

The outdoor air inlet 2011 is formed on the upper surface of the outdoor air inlet space S1, and the outdoor air outlet 2012 is formed on the upper surface of the outdoor air discharge space S2. The indoor air inlet 2013 is formed on the upper surface of the indoor air inlet space S3, and the indoor air outlet 2014 is formed on the upper surface of the indoor air discharge space S4.

In addition, the ventilation unit 20 includes an indoor air inlet guide duct 24 erected in the indoor air inlet space S3, an outdoor air discharge guide duct 25 erected in the outdoor air discharge space S2, an indoor air discharge guide duct 26 erected in the indoor air discharge space S4, and a bypass duct 27 extending from one side surface of the indoor air inlet guide duct 24 and connected to the indoor air discharge space S4.

The bypass duct 27 extends and bends along the edge of the upper housing 201 from one side surface of the indoor air inlet guide duct 24 to bypass the ventilation module 23, passes through the outdoor air inlet space S1 and extends to the indoor air discharge space S4. That is, the outlet of the bypass duct 27 communicates with the indoor air discharge space S4.

In addition, the ventilation unit 20 includes a suction fan module 21 disposed in the outdoor air discharge space S2 and having an outlet connected to one side surface of the outdoor air discharge guide duct 25, and an exhaust fan module 22 disposed in the indoor air discharge space S4 and connected to one side surface of the indoor air discharge guide duct 26.

The suction fan module 21 includes a fan housing 211, a suction fan 212 accommodated in the fan housing 211, and a fan motor 213 configured to drive the suction fan 212. Like the suction fan module 21, the exhaust fan module 22 also includes a fan housing 221, an exhaust fan 222, and a fan motor 223.

Meanwhile, the air conditioning unit 30 includes an evaporation fan module 34 accommodated in the lower housing 301, an evaporator 32, and a drain pan 33 disposed under the evaporator 32. Like the suction fan module 21 or the exhaust fan module 22, the evaporation fan module 34 also includes a fan housing, an evaporation fan, and a fan motor.

When a refrigerant cycle operates as a heat pump, the evaporator 32 functions as a condenser and the evaporation fan module 34 functions as a condensing fan module. Therefore, as a term inclusive of all of these, the evaporator 32 may be defined as a heat exchanger, and the evaporation fan module 34 may be defined as an air conditioning fan module.

A boundary wall 31 may divide the inner space of the lower housing 301 into an evaporator space in which the evaporator 32 is accommodated and an evaporation fan space in which the evaporation fan module 33 is accommodated.

A communication hole 311 is formed in the boundary wall 31, and the outlet of the evaporation fan module 34 is coupled to the communication hole 311. Therefore, the air introduced into the evaporation fan space passes through the boundary wall 31 by the evaporation fan module 34 and is guided to the evaporator space. The air guided to the evaporator space exchanges heat with the evaporator 32.

Figure 6:
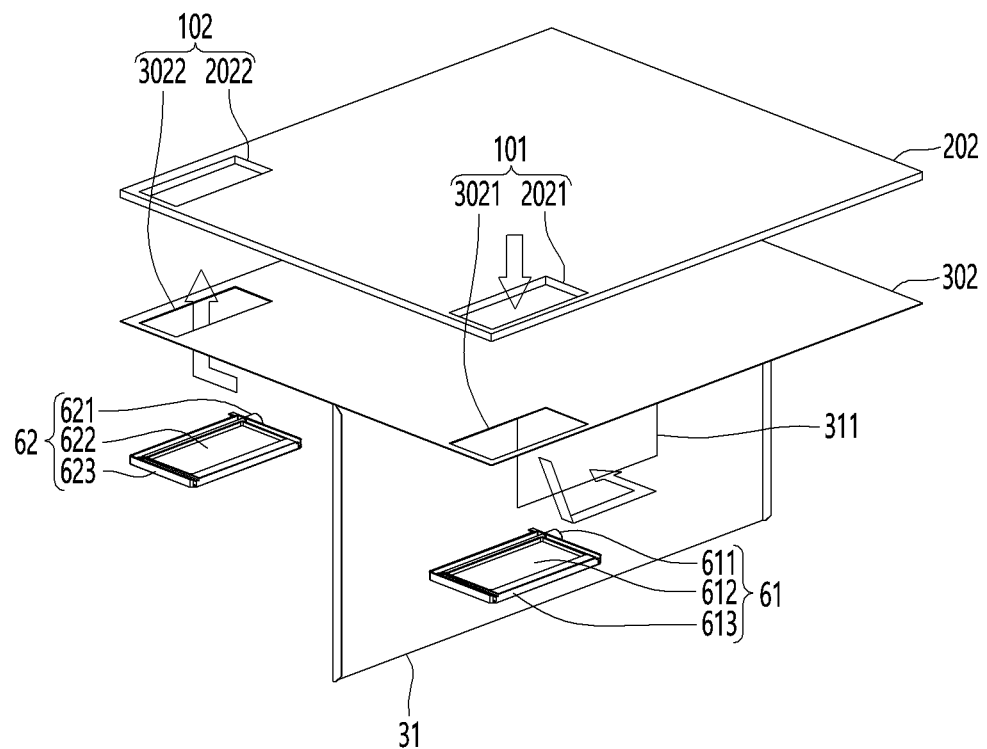
FIG. 6 is an exploded perspective view showing a structure of an interface between a ventilation unit and an air conditioning unit.

In addition, an air conditioning inlet 101 and an air conditioning outlet 102 are formed in the interface between the ventilation unit 20 and the air conditioning unit 30 (see FIG. 6). An air conditioning damper module 60 is mounted on the air conditioning inlet 101 and the air conditioning outlet 102. The air conditioning damper module 60 includes an inlet-side air conditioning damper module 61 configured to open or close the air conditioning inlet 101 and an outlet-side air conditioning damper module 62 configured to open or close the air conditioning outlet 102.

The air conditioning inlet 101 communicates with the indoor air inlet guide duct 24, and the air conditioning outlet 102 communicates with the outdoor air discharge guide duct 25.

FIG. 6 is an exploded perspective view showing the structure of the interface between the ventilation unit and the air conditioning unit.

Referring to FIG. 6, the upper surface 302 of the air conditioning unit 30 is in close contact with the lower surface 202 of the ventilation unit 20.

In detail, a first opening 2021 forming the air conditioning inlet 101 and a second opening 2022 forming the air conditioning outlet 102 are formed in the lower surface 202 of the ventilation unit 20.

A first opening 3021 forming the air conditioning inlet 101 and a second opening 3022 forming the air conditioning outlet 102 are formed in the upper surface 302 of the air conditioning unit 30.

The first openings 2021 and 3021 are aligned in the vertical direction to form the air conditioning inlet 101, and the second openings 2022 and 3022 are aligned in the vertical direction to form the air conditioning outlet 102. The inlet-side air conditioning damper 61 is mounted on the air conditioning inlet 101, and the outlet-side air conditioning damper 62 is mounted on the air conditioning outlet 102.

In addition, the air conditioning damper includes damper frames 613 and 623, damping plates 612 and 622, and damping motors 611 and 621.

The damping plates 612 and 622 are rotatably connected to the damper frames 613 and 623, and the driving shafts of the damping motors 611 and 621 are connected to the rotational shafts of the damping plates 612 and 622.

Figure 7:
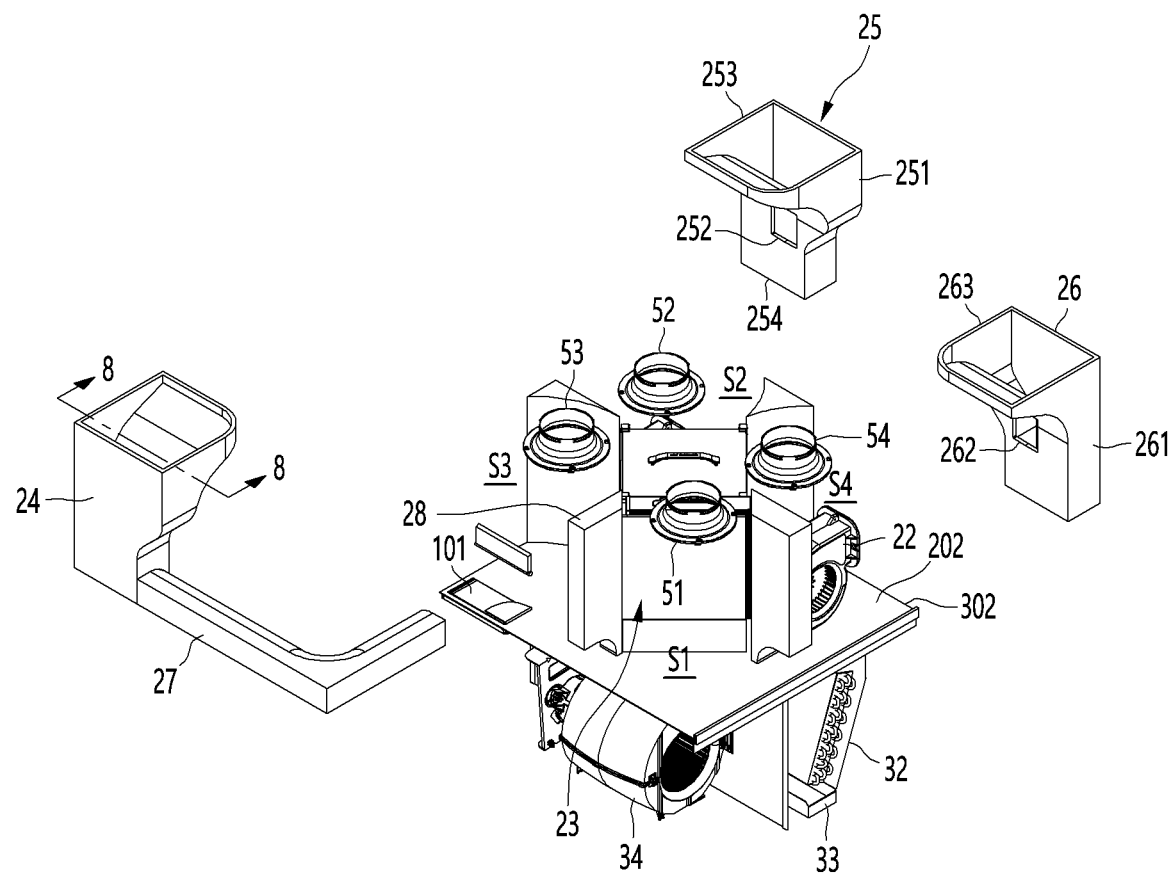
FIG. 7 is an exploded perspective view showing the internal configuration of the ventilation apparatus according to an embodiment of the present disclosure.

FIG. 7 is an exploded perspective view showing the internal configuration of the ventilation apparatus according to an embodiment of the present disclosure.

Referring to FIG. 7, a separate guide duct is not installed in the outdoor air inlet space S1. This is because, when the outdoor air introduced into the outdoor air inlet space S1 passes through the suction surface of the ventilation module 23, that is, the surface on which the pre-filter 233 is mounted, it is necessary to pass evenly over the entire suction surface. That is, it is more advantageous not to dispose a separate guide duct in order to allow the introduced outdoor air to pass uniformly over the entire suction surface of the ventilation module 23.

The outdoor air discharge guide duct 25 includes a duct body 251, a suction fan mounting hole 252 formed on one side surface of the duct body 251, an air conditioning inlet 254 formed in the bottom surface of the duct body 251, and an outdoor air outlet 253 formed in the upper surface of the duct body 251.

The outlet of the suction fan module 21 is connected to the suction fan mounting hole 252, so that the outdoor air passing through the ventilation module 23 is supplied to the indoor space through the outdoor air outlet 253.

The lower end of the outdoor air discharge guide duct 25 communicates with the air conditioning outlet 102, so that the indoor air heat-exchanged while passing through the evaporator 32 is supplied to the indoor space through the outdoor air outlet 253.

In addition, the indoor air discharge guide duct 26 includes a duct body 261, an exhaust fan mounting hole 262 formed in one side surface of the duct body 261, and an indoor air outlet 263 formed in the upper surface of the duct body 261.

The bottom surface of the duct body 261 has a structure that is not opened. Alternatively, even if opened, the bottom surface of the duct body 261 is shielded by the bottom surface 202 when seated on the lower surface 202 of the upper housing 201.

The outlet of the exhaust fan module 22 is connected to the exhaust fan mounting hole 262, so that the indoor air passing through the ventilation module 23 is discharged to the outside through the indoor air outlet 263.

Figure 8:
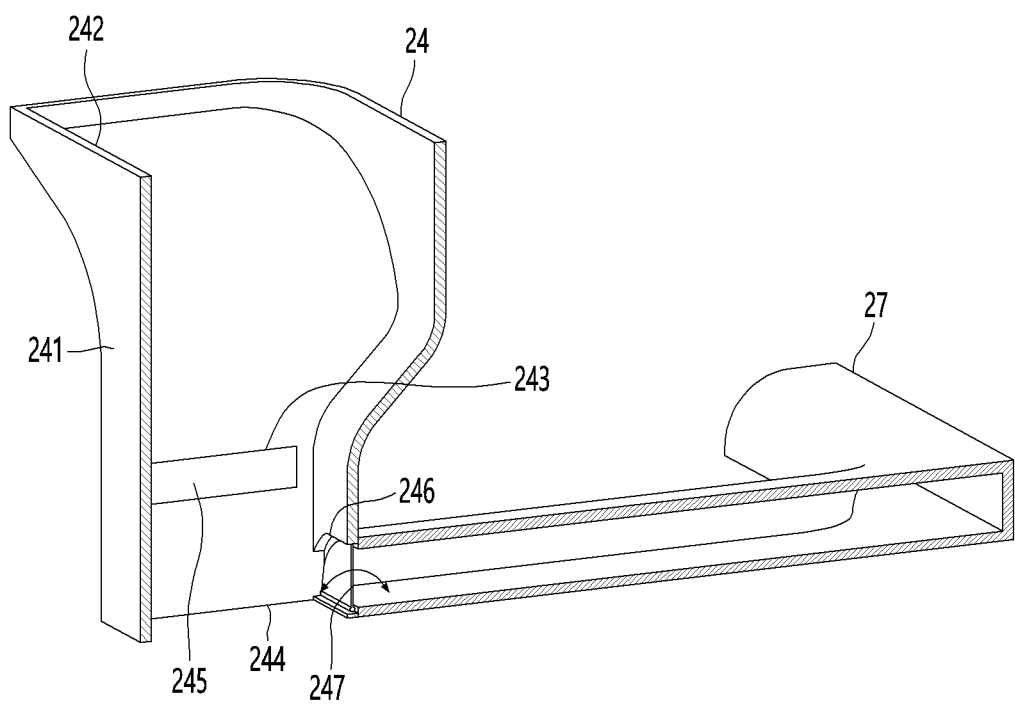
FIG. 8 is a cutaway perspective view of an indoor air inlet guide duct and a bypass duct taken along line 8-8 of FIG. 7.

FIG. 8 is a cutaway perspective view of the indoor air inlet guide duct and the bypass duct taken along line 8-8 of FIG. 7.

Referring to FIG. 8, the inlet of the bypass duct 27 is connected to the indoor air inlet guide duct 24.

In detail, the indoor air inlet guide duct 24 includes a duct body 241, a total heat exchange outlet 243 formed on one side surface of the duct body 241, an air conditioning outlet 244 formed at the lower end of the duct body 241, an indoor air inlet 242 formed at the upper end of the duct body 241, and a bypass hole 246 formed on the other side surface of the duct body 241.

A total heat exchange damper module 245 is mounted on the total heat exchange outlet 243, and a bypass damper module 247 is mounted on the bypass hole 246.

The total heat exchange damper module 245 and the bypass damper module 247 selectively operate according to the operation mode to open or close the total heat exchange outlet 243 and the bypass hole 246. The air conditioning outlet 244 communicates with the air conditioning inlet 101.

With this structure, the indoor air introduced into the indoor air inlet 242 passes through at least one of the total heat exchange outlet 243, the air conditioning outlet 244, and the bypass hole 246 according to the operation mode.

Figure 9:
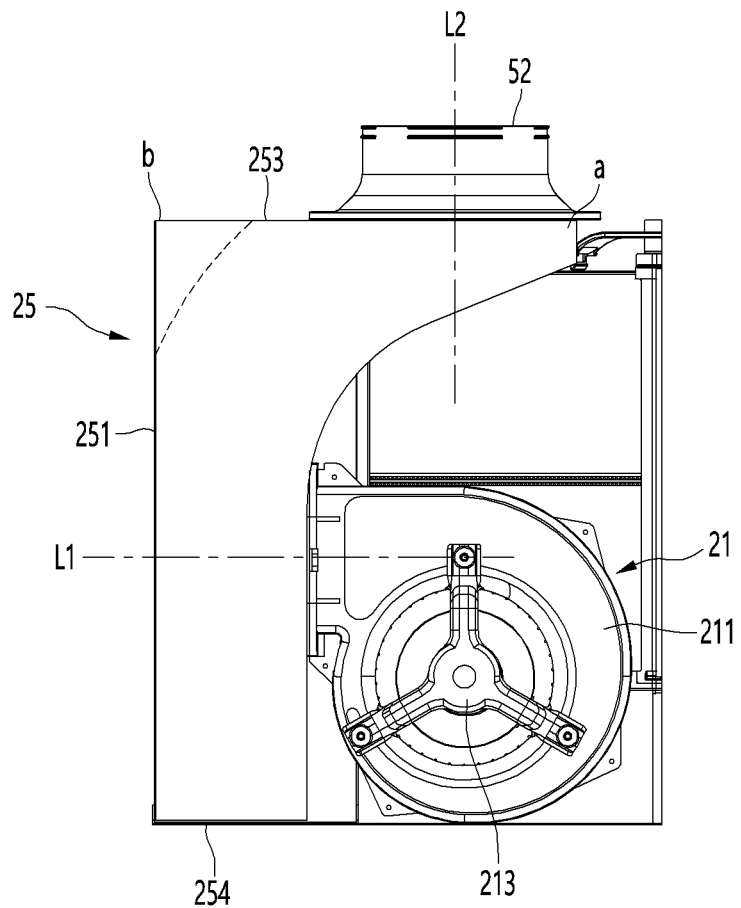
FIG. 9 is a side view of a guide duct showing an installation structure of a guide duct and a duct flange.
Figure 10:
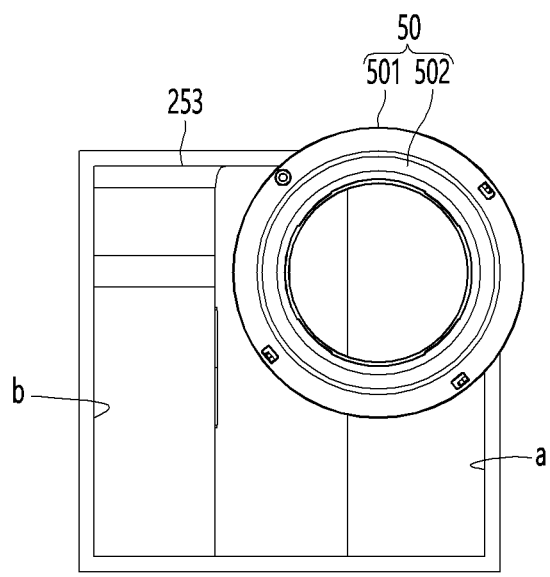
FIG. 10 is a plan view of the guide duct showing the installation structure of the guide duct and the duct flange.
Figure 11:
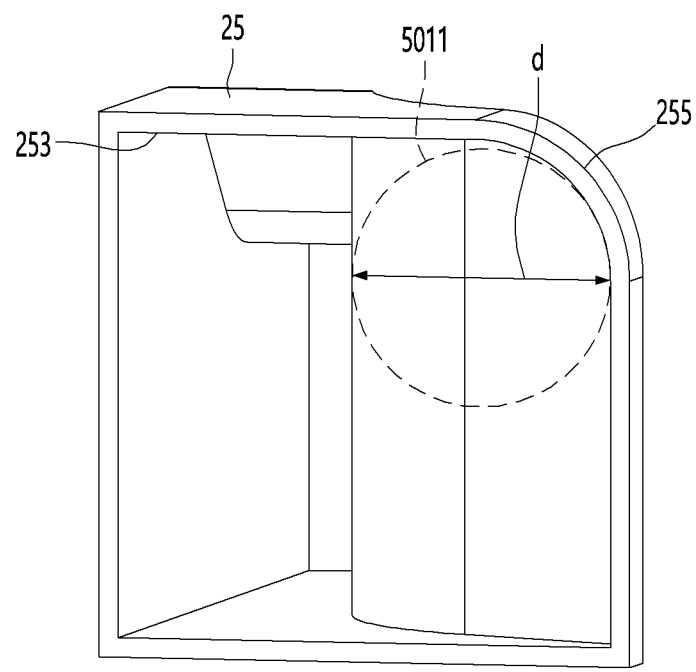
FIG. 11 is a plan view of the duct flange from which the duct flange is removed.

FIG. 9 is a side view of the guide duct showing the installation structure of the guide duct and the duct flange, FIG. 10 is a plan view of the guide duct showing the installation structure of the guide duct and the duct flange, and FIG. 11 is a plan view of the duct flange from which the duct flange is removed.

Referring to FIGS. 9 to 11, the guide duct according to an embodiment of the present disclosure is designed in a shape in which the cross-sectional area increases from the bottom to the top. Hereinafter, the outdoor air discharge guide duct 25 among the three guide ducts will be described as an example. That is, although the outdoor air discharge guide duct 25 will be described as a representative, the same applies to the indoor air inlet guide duct 24 and the indoor air discharge guide duct 26.

In detail, the duct flange 50 includes a seating portion 501 having a circular ring shape, and a duct connection portion 502 extending upward from the inner edge of the seating portion 501. The seating portion 501 is in close contact with the upper surface of the upper housing 201, and the connection portion 502 extends upward from the inner edge of the seating portion 501.

The seating portion 501 is mounted on the flange connector 2010 formed in the upper housing 201. The diameter of the flange connector 2010 may be designed to have a length corresponding to the inner diameter of the seating portion 501, or may be designed to be larger than the inner diameter of the seating portion 501.

The outdoor air discharge guide duct 25 includes a straight pipe portion extending in a hollow rectangular parallelepiped shape from the lower end to a predetermined height, and an expanded pipe portion in which the cross-sectional area is gradually increased at the upper end of the straight pipe portion. To this end, one or more of the four surfaces of the outdoor air discharge guide duct 25 extends to be rounded with a predetermined curvature, so that the cross-sectional area of the upper end of the outdoor air discharge guide duct 25 is designed to be larger than the cross-sectional area of the lower end.

A line L1 passing through the center of the outlet of the suction fan module 21 crosses a line L2 passing through the center of the duct flange 50 (here, the outdoor air outlet flange 52). In other words, the outlet of the suction fan module 21 is coupled to the outdoor air discharge guide duct 25 to face the side surface of the upper housing 201, and the outlet of the exhaust fan module 22 is also coupled to the indoor air discharge guide duct 26 to face the side surface of the upper housing 301.

In the case of the conventional ventilation apparatus, the center of the flange connector 2010 and the center of the outlet of the fan module are aligned on the same line. At this time, when the shape and size of the outlet of the fan module are designed to be different from the shape and size of the flange connector 2010, flow resistance occurs inside the duct flange 50, causing a phenomenon in which air is not smoothly discharged.

However, in the ventilation unit 20 according to the present disclosure, since the outlet of the fan module and the outlet of the duct flange are not aligned on the same line and are directed in directions crossing each other. Therefore, the flow resistance problem that occurs in the conventional ventilation apparatus does not occur.

In addition, since the area of the upper end of the guide duct to which the duct flange is mounted is designed to be significantly larger than the diameter of the duct flange, there is an advantage in that the design freedom of the duct flange is increased.

Meanwhile, the duct flange 50 may be mounted adjacent to the edge of the outdoor air discharge guide duct 25, and a round portion 255 may be formed at the corner of the outdoor air discharge guide duct 25 on the side on which the duct flange is seated. The round portion 255 may be formed to be rounded with the same radius of curvature as the radius of the inner edge 5011 of the seating portion 501.

The center of the flange connector 2010 may be designed to be aligned on the same vertical line as the center of the seating portion 501, and the diameter of the flange connector 2010 and the inner diameter of the seating portion 501 may be designed to have the same size.

The corner of the guide duct on which the round portion 255 is formed may be the corner adjacent to the center of the ventilation unit 20. As a result, the four duct flanges can be mounted at positions as close as possible to the center of the upper surface of the ventilation unit 20.

When the guide duct is a duct for guiding the discharge of outdoor air or indoor air, the duct flange is located at the end of the outlet of the guide duct. Accordingly, flow resistance can be minimized.

For example, when the outdoor air discharge flange 52 is mounted on the outer edge b of the outdoor air outlet 253, a vortex is generated in the space between the outdoor air discharge flange 52 and the inner edge a of the outdoor air outlet 253, thereby increasing the flow resistance.

Hereinafter, the flow of indoor air and outdoor air made for each operation mode in the ventilation apparatus according to the embodiment of the present disclosure will be described with reference to the drawings.

Figure 12:
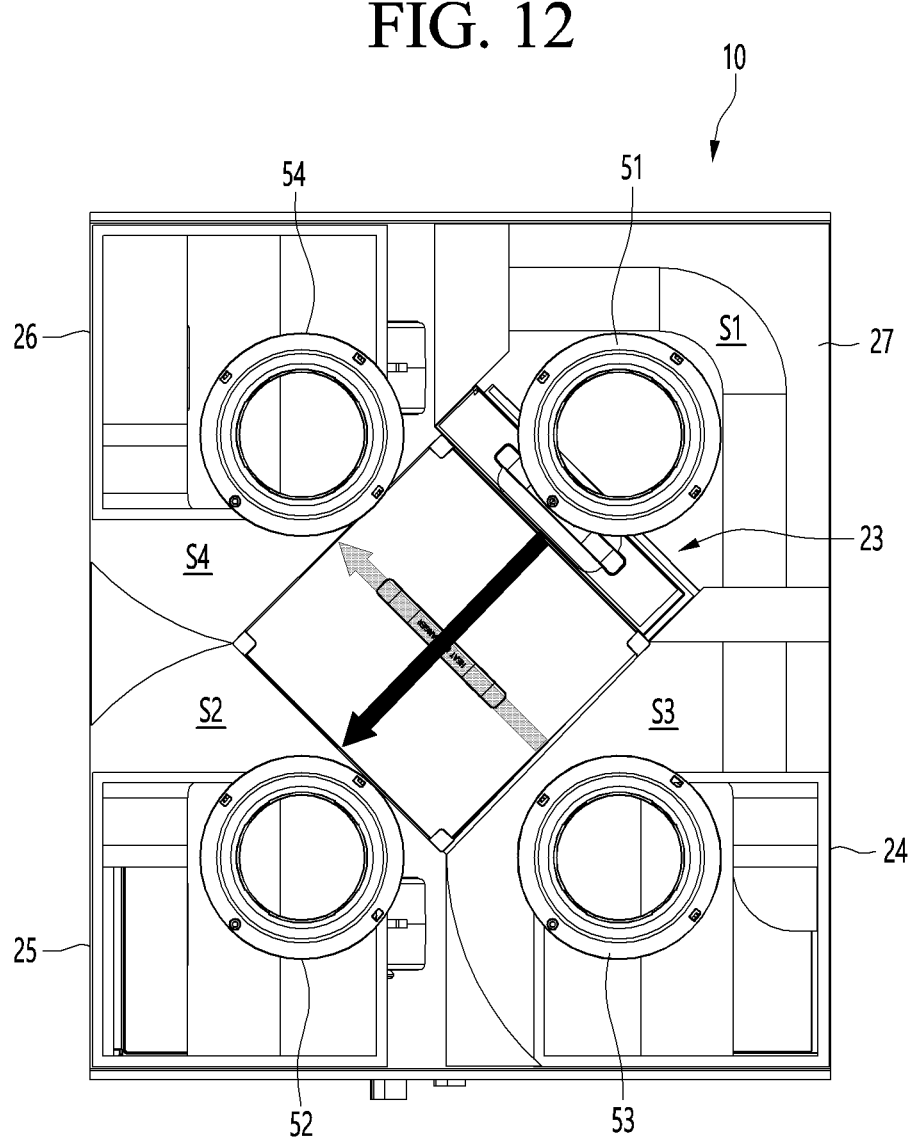
FIG. 12 is a view showing air flow inside the ventilation apparatus in a total heat exchange ventilation mode.

FIG. 12 is a view showing air flow inside the ventilation apparatus in a total heat exchange ventilation mode.

Referring to FIG. 12, when the total heat exchange ventilation mode is executed, both the suction fan module 21 and the exhaust fan module 22 operate and the total heat exchange damper module 245 operates, and thus, the total heat exchange outlet 243 of the indoor air inlet guide duct 24 is opened. The air conditioning inlet 101 and the air conditioning outlet 102 are maintained in a closed state, and the evaporation fan module 34 is not driven.

In this state, when the suction fan module 21 is driven, outdoor air is introduced into the outdoor air inlet space S1 through the outdoor air inlet duct 41. The outdoor air introduced into the outdoor air inlet space S1 passes through the ventilation module 23 and is then guided to the outdoor air discharge space S2. The outdoor air guided to the outdoor air discharge space S2 is sucked by the suction fan module 21 and is supplied to the indoor space through the outdoor air discharge guide duct 25 and the outdoor air discharge duct 42.

When the exhaust fan module 22 is driven, the indoor air is guided to the indoor air inlet guide duct 24 through the indoor air inlet duct 43, and is discharged to the indoor air inlet space S3 through the total heat exchange outlet 243. The indoor air discharged to the indoor air inlet space S3 passes through the total heat exchange element 231 and is then guided to the indoor air discharge space S4. The outdoor air and the indoor air exchange heat while passing through the ventilation module 23 (waste heat recovery).

The indoor air guided to the indoor air discharge space S4 is sucked by the exhaust fan module 22 and then discharged to the outside through the indoor air discharge guide duct 26 and the indoor air discharge duct 44.

In winter, by the waste heat recovery process occurring in the ventilation module 23, the outdoor air absorbs heat from the indoor air discharged to the outside and is then supplied to the indoor space, thereby preventing a sudden drop in the indoor temperature.

On the other hand, in summer, heat is emitted from the outdoor air to the indoor air discharged to the outside and supplied to the indoor space in a low temperature state, thereby preventing a sudden increase in the indoor temperature.

Figure 13:
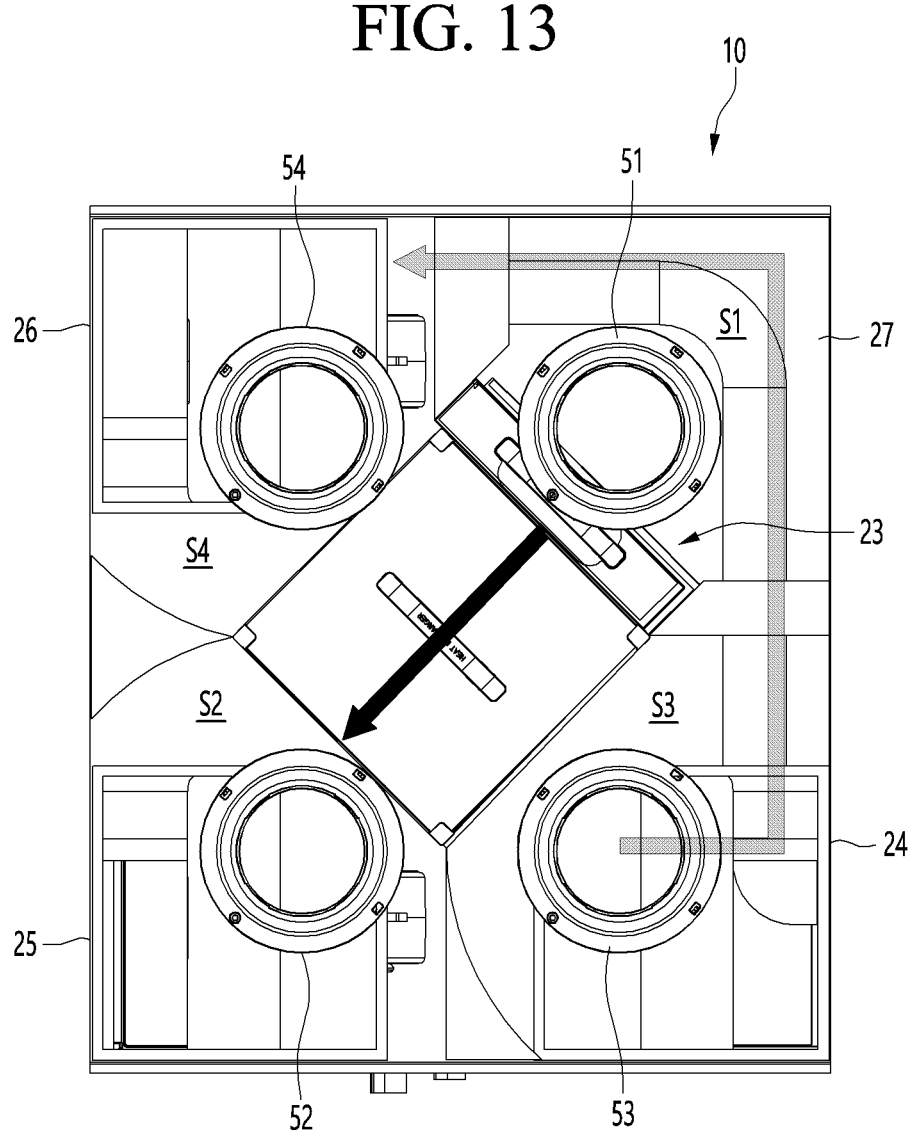
FIG. 13 is a view showing air flow inside the ventilation apparatus in a quick ventilation mode.

FIG. 13 is a view showing air flow inside the ventilation apparatus in a quick ventilation mode.

Referring to FIG. 13, when the quick ventilation mode (or outdoor air cooling mode) is executed, the suction fan module 21 and the exhaust fan module 22 operate, and the evaporation fan module 34 does not operate.

The total heat exchange outlet 243, the air conditioning inlet 101, and the air conditioning outlet 102 are closed, and the bypass damper module 247 operates to open the bypass hole 246.

When the suction fan module 21 operates in this state, outdoor air sequentially passes through the outdoor air inlet duct 41, the outdoor air inlet space S1, the ventilation module 23, the outdoor air discharge space S2, the suction fan module 21, the outdoor air discharge guide duct 25, and the outdoor air discharge and is supplied to the indoor space.

When the exhaust fan module 22 operates, the indoor air sequentially passes through the indoor air inlet duct 43, the indoor air inlet guide duct 24, the bypass duct 27, the indoor air discharge space S4, the exhaust fan module 22, the indoor air discharge guide duct 26, and the indoor air discharge duct 44 and is discharged to the outside.

In this case, since the indoor air does not pass through the ventilation module 23, the outdoor air introduced into the indoor space is discharged to the indoor space at an outdoor temperature. Accordingly, when the quick ventilation mode is executed in autumn or winter, fresh outdoor air having a low temperature is supplied to the indoor space.

In addition, since the indoor air does not pass through the ventilation module 23, oil, smoke, and other harmful substances scattered in the air during the cooking process are directly discharged to the outside during cooking a kitchen, thereby minimizing contamination of the ventilation module 23.

When the total heat exchange ventilation mode is executed during cooling in the kitchen, the inner circumferential surface of the total heat exchange element of the ventilation module 23 is contaminated while the contaminated indoor air passes through the ventilation module 23. As a result, the life of the total heat exchange element may be shortened.

Accordingly, when the indoor air is heavily contaminated, the quick ventilation mode using the bypass duct is executed to allow the indoor air to be quickly discharged to the outside and to minimize contamination of the total heat exchange element.

Figure 14:
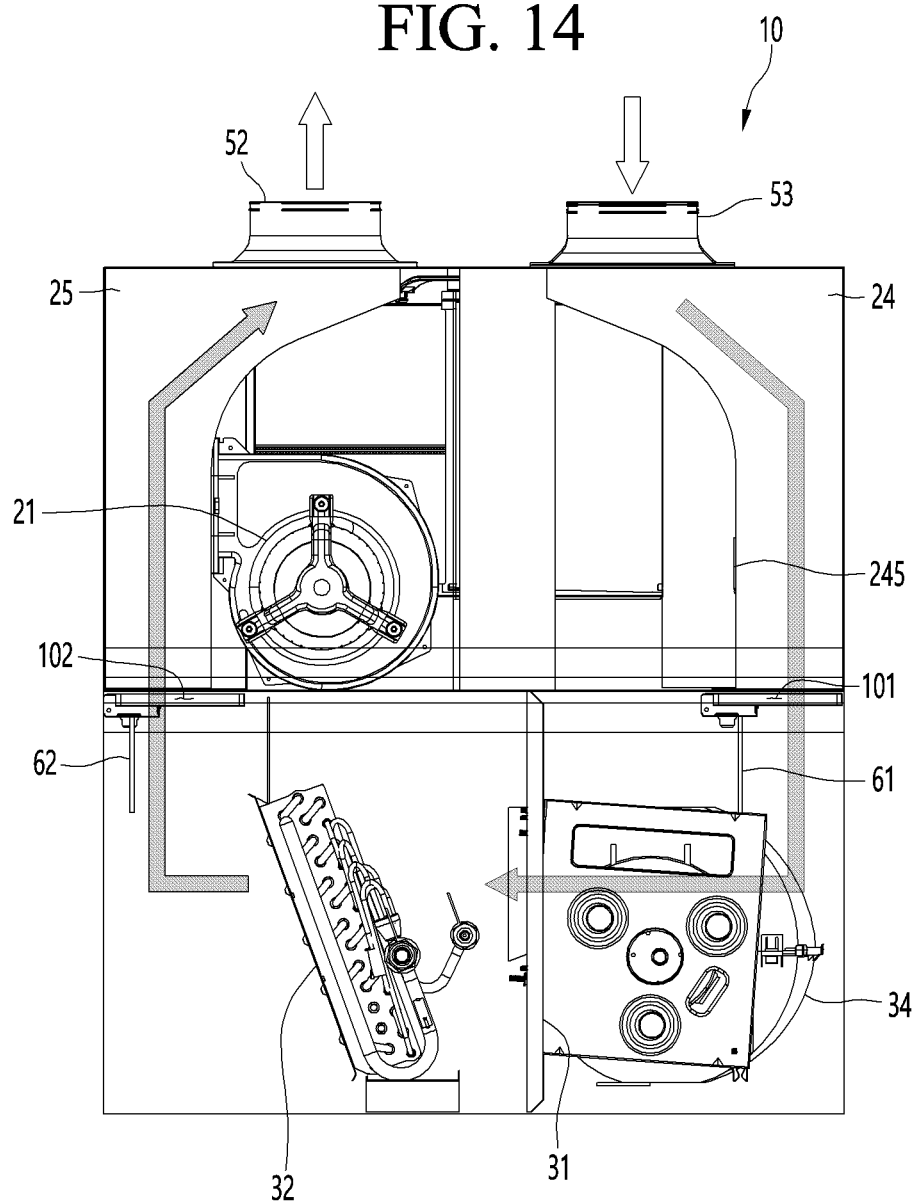
FIG. 14 is a view showing air flow inside the ventilation apparatus in a quick cooling mode.

FIG. 14 is a view showing air flow inside the ventilation apparatus in a quick cooling mode.

Referring to FIG. 14, when the quick cooling mode is executed, the suction fan module 21 and the exhaust fan module 22 are stopped and only the evaporation fan module 34 operates.

The inlet-side air conditioning damper 61 and the outlet-side air conditioning damper 62 operate to open both the air conditioning inlet 101 and the air conditioning outlet 102.

The total heat exchange outlet 243 and the bypass hole 246 maintain a closed state.

When the evaporation fan module 34 operates in this state, the indoor air passes through the indoor air inlet duct 43, the indoor air inlet guide duct 24, and the air conditioning inlet 101, and is guided to the inside of the air conditioning unit 30 in which the evaporation fan module 34 is installed.

The indoor air guided to the air conditioning unit passes through the air conditioning outlet 102 in a state in which the temperature thereof is lowered while passing through the evaporation fan module 34, and is discharged again to the indoor space through the outdoor air outlet guide duct 25 and the outdoor air discharge duct 42.

In addition, a damper module may be mounted in the suction fan mounting hole 252 of the outdoor air discharge guide duct 25. In the quick cooling mode, the suction fan mounting hole 252 may be maintained in a closed state by the damper module.

Figure 15:
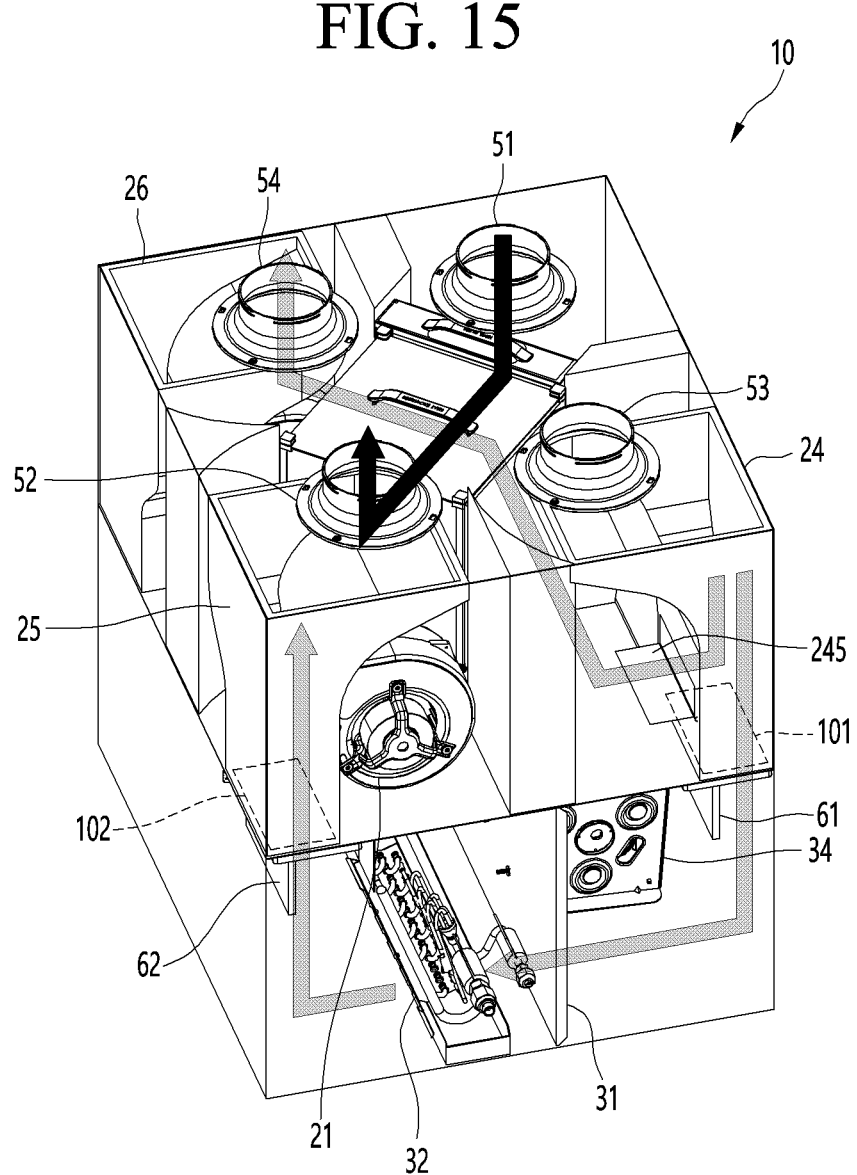
FIG. 15 is a view showing air flow inside the ventilation apparatus in a total heat exchange ventilation/cooling simultaneous mode.

FIG. 15 is a view showing air flow inside the ventilation apparatus in a total heat exchange ventilation/cooling simultaneous mode.

Referring to FIG. 15, when the total heat exchange ventilation/cooling simultaneous mode is executed, the total heat exchange ventilation mode and the quick cooling mode are simultaneously performed.

To this end, the suction fan module 21, the exhaust fan module 22, and the evaporation fan module 34 all operate, the total heat exchange outlet 243, the air conditioning inlet 101, and the air conditioning outlet 102 are opened, and the bypass hole 246 is closed.

In this state, the exhaust fan module 22 operates so that the indoor air flowing along the indoor air inlet duct 43 and the indoor air inlet guide duct 24 flows into the total heat exchange outlet 243 and the air conditioning inlet 101. The indoor air discharged through the total heat exchange outlet 243 passes through the total heat exchange element 231 and is discharged to the outside, and the indoor air discharged through the air conditioning inlet 101 is supplied back into the indoor space through the evaporator 34, the outdoor air discharge guide duct 25, and the outdoor air discharge duct 42.

In addition, the suction fan module 21 operates so that outdoor air is guided to the outdoor air inlet space S1 through the outdoor air inlet duct 41 and is guided to the ventilation module 23 and the outdoor air discharge space S2. 'The outdoor air is guided to the outdoor air discharge guide duct 25 by the suction fan module 21, is mixed with low-temperature indoor air passing through the evaporator 34 in the outdoor air discharge guide duct 25, and is supplied to the indoor space through the outdoor air discharge duct 42.

Figure 16:
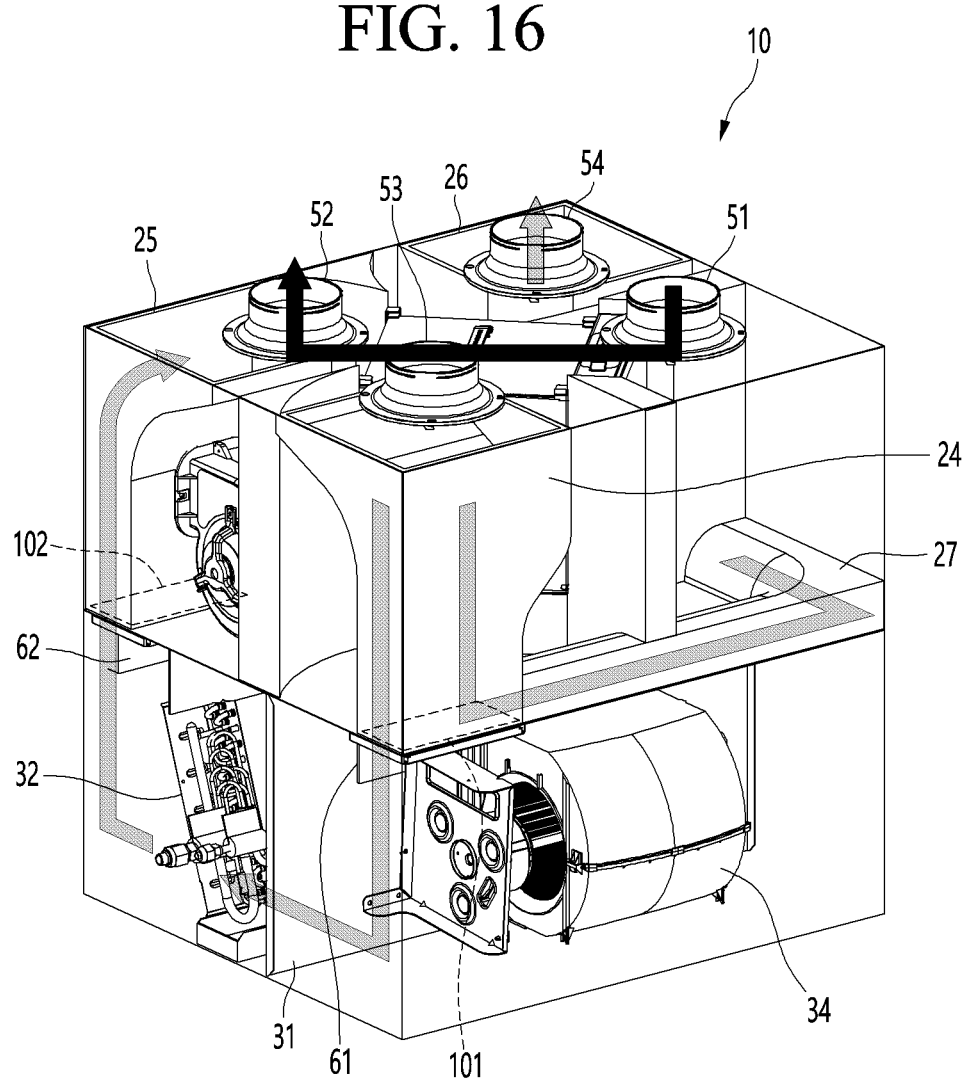
FIG. 16 is a view showing air flow inside the ventilation apparatus in a quick ventilation/cooling simultaneously mode.

FIG. 16 is a view showing air flow inside the ventilation apparatus in a quick ventilation/cooling simultaneously mode.

Referring to FIG. 16, when the quick ventilation/cooling simultaneous mode is executed, the quick ventilation mode and the cooling mode are simultaneously performed.

To this end, the suction fan module 21, the exhaust fan module 22, and the evaporation fan module 34 all operate, and the total heat exchange outlet 243 is closed. On the other hand, the air conditioning inlet 101, the air conditioning outlet 102, and the bypass hole 246 are opened.

In this state, the indoor air introduced into the indoor air inlet duct 43 when the suction fan module 21 operates flows into the air conditioning inlet 101 and the bypass hole 246 inside the indoor air inlet guide duct 24.

The indoor air guided to the bypass duct 27 through the bypass hole 246 is discharged to the outside through the indoor air discharge space S4, the indoor air discharge guide duct 26, and the indoor air discharge duct 44.

On the other hand, the indoor air passing through the air conditioning inlet 101 passes through the evaporation fan module 34 and the evaporator 32 and is supplied back to the indoor space through the outdoor air guide duct 25 and the outdoor air discharge duct 42.

The exhaust fan module 22 operates so that outdoor air is guided to the outdoor air inlet duct 41, the outdoor air inlet space S1, the ventilation module 23, and the outdoor air discharge space S2. The outdoor air guided to the outdoor air discharge space S2 is guided to the outdoor air discharge guide duct 25, is mixed with the indoor air passing through the evaporator 32, and is supplied to the indoor space through the outdoor air discharge duct 42.

Meanwhile, a compressor, a condenser, and a four-way valve constituting the refrigerant cycle are disposed outside the ventilation apparatus 10. Therefore, there is an advantage in that the load of the ventilation apparatus 10 is relatively light and the cooling mode and the heating mode can be selectively driven through the opening/closing control of the four-way valve.

In other words, when the refrigerant cycle operates as a heat pump through the opening/closing control of the four-way valve, the evaporator 32 functions as a condenser, and thus, there is an advantage in that indoor heating is also possible.

Figure 17:
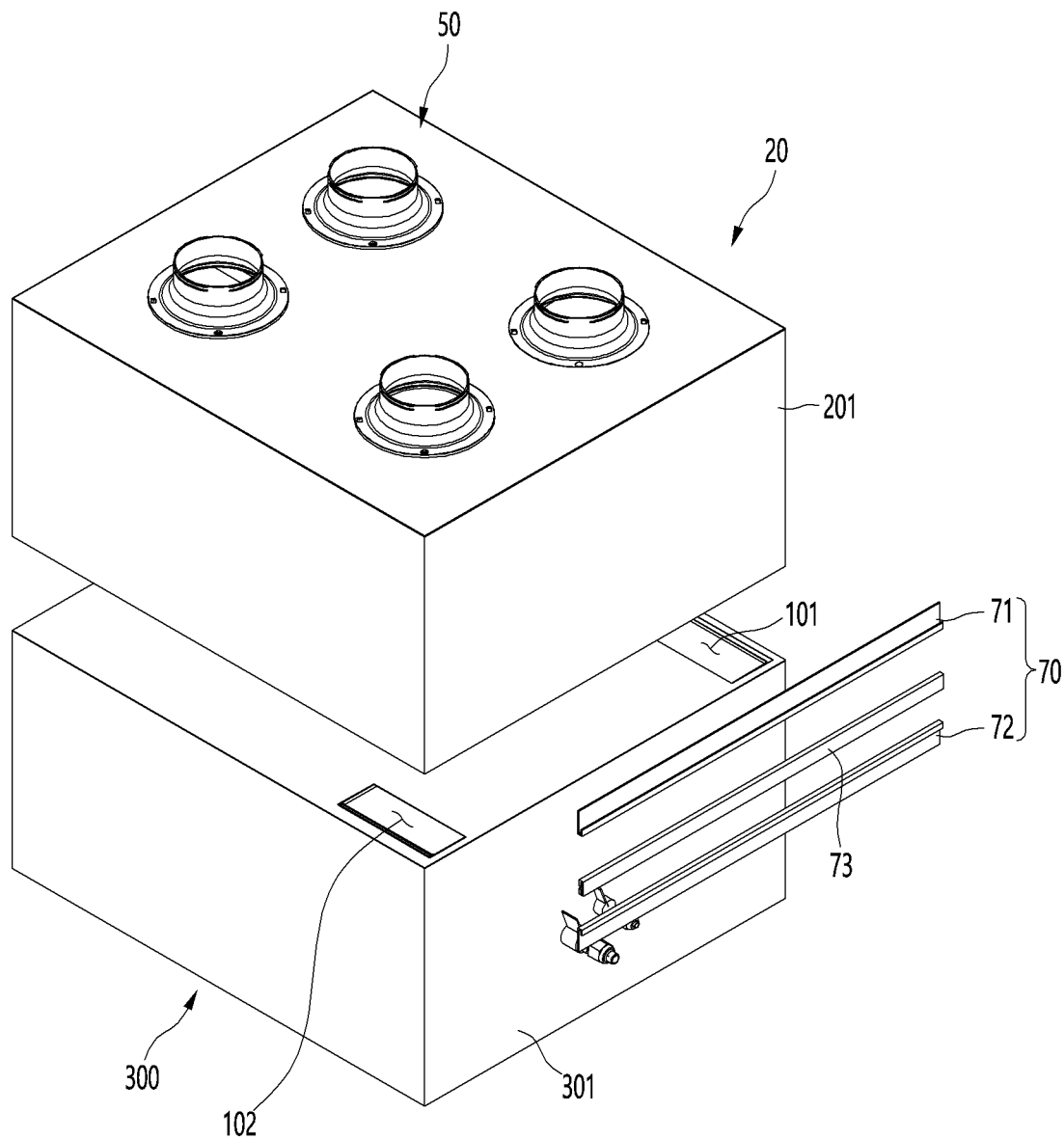
FIG. 17 is an exploded perspective view of the ventilation apparatus showing a state in which the ventilation unit and the air conditioning unit are connected by a connection unit.
Figure 18:
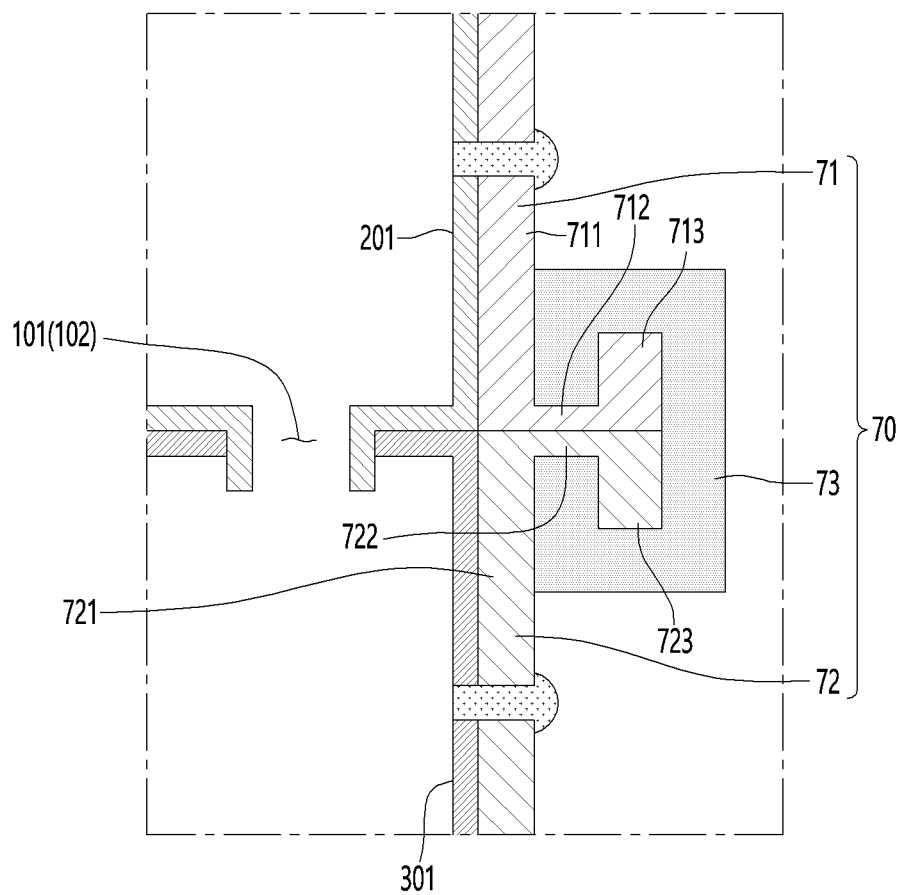
FIG. 18 is a longitudinal cross-sectional view taken along line 18-18 of FIG. 1.

FIG. 17 is an exploded perspective view of the ventilation apparatus showing a state in which the ventilation unit and the air conditioning unit are connected by a connection unit, and FIG. 18 is a longitudinal cross-sectional view taken along line 18-18 of FIG. 1.

Referring to FIGS. 17 and 18, the ventilation unit 20 and the air conditioning unit 30 are detachably connected by the connection unit 70.

In detail, the connection unit 70 includes a ventilation-side flange 71 coupled to two opposite side surfaces of the upper housing 201 constituting the outer shape of the ventilation unit 20, an air conditioning-side flange 72 coupled to two opposite sides of the lower housing 301 constituting the outer shape of the air conditioning unit 30, and a coupler 73 for connecting the ventilation-side flange 71 and the air conditioning-side flange 72.

The connection unit 70 may be formed to have a length equal to or shorter than the length from the front to the rear of the ventilation apparatus 10.

The side surface of the upper housing 201 to which the ventilation-side flange 71 is coupled and the side surface of the lower housing 301 to which the air conditioning-side flange 72 is coupled pass through the same vertical plane.

The ventilation-side flange 71 is coupled to the lower end of the side surface of the upper housing 201, and the air conditioning-side flange 72 is coupled to the upper end of the side surface of the lower housing 201.

The longitudinal cross-sections of the ventilation-side flange 71 and the air conditioning-side flange 72 may be symmetrical with respect to a horizontal plane.

Specifically, the ventilation-side flange 71 includes a close contact portion 711 in close contact with the side surface of the ventilation apparatus 10, a bent portion 712 extending horizontally from the lower end of the contact portion 711 in a direction away from the side surface of the upper housing 201, and an extension portion 713 bent upward from the end of the bent portion 712.

In addition, the air conditioning-side flange 72 has a cross section symmetrical to the ventilation-side flange 71, and includes a close contact portion 721, a bent portion 712, and an extension portion 713.

The coupler 73 may have a cross-sectional shape that is bent multiple times to surround the two extension portions 723. That is, the coupler 73 may be bent twice by 90 degrees at two positions spaced apart by the same distance from the center of the short side, and may have a cross-sectional shape in which the two long sides are spaced apart. The two long sides may be spaced apart by a distance corresponding to the sum of the thicknesses of the bent portions 712 and 722.

In order to couple the ventilation unit 20 and the air conditioning unit 30, the ventilation unit 20 is stacked on the upper surface of the air conditioning unit 30. Accordingly, the bent portion 712 of the ventilation-side flange 71 and the bent portion 722 of the air conditioning-side flange 72 are in close contact with each other, and the extension portion 713 of the ventilation-side flange 71 and the extension portion 723 of the air conditioning-side flange 72 extend in opposite directions.

In this state, the rear end of the coupler 73 is positioned at the front end of the flanges 71 and 72 and then the coupler 73 is moved in the longitudinal direction of the flanges 71 and 72.

In other words, the bent portions 712 and 722 are fitted in the space formed between the two long sides of the coupler 73, and the flanges 71 and 72 and the coupler 73 are aligned on the same horizontal line so that the extension portions 713 and 723 are in a state that can be accommodated in the coupler 73. In this state, when the rear end of the coupler 73 is slid backward, the extension portions 713 and 723 are completely inserted into the coupler 73. Accordingly, the ventilation-side flange 71 and the air conditioning-side flange 72 are not separated and maintain a combined state.

The coupler 73 may be made of a metal plate having a strength that does not spread by the load of the ventilation unit 30.

What is claimed is:

1. A ventilation apparatus comprising:
    a housing defining an inner space, the housing having an outdoor air inlet, an outdoor air outlet, an indoor air inlet, and an indoor air outlet;
    a partition configured to divide the inner space of the housing into a ventilation space and an air conditioning space;
    a total heat exchange element located in the ventilation space, the total heat exchange element having a hexahedral shape with four side edges respectively disposed to face four side surfaces of the housing;
    four partition walls configured to respectively connect the four side edges of the total heat exchange element and the four side surfaces of the housing to partition the ventilation space, except for a space for the total heat exchange element, into an outdoor air inlet space, an outdoor air discharge space, an indoor air inlet space, and an indoor air discharge space;
    an outdoor air discharge guide duct disposed in the outdoor air discharge space;
    an indoor air inlet guide duct disposed in the indoor air inlet space;
    an indoor air discharge guide duct disposed in the indoor air discharge space;
    a suction fan disposed in the outdoor air discharge space, the suction fan being configured to draw outdoor air through the outdoor air inlet;
    an exhaust fan disposed in the indoor air discharge space, the exhaust fan being configured to draw indoor air through the indoor air inlet;
    a bypass duct branching from the indoor air inlet guide duct, the bypass duct being configured to bypass the total heat exchange element, the bypass duct extending to the indoor air discharge space;
    a boundary wall configured to partition the air conditioning space into a first space and a second space;
    a heat exchanger located in the first space; and
    an air conditioning fan disposed in the second space.

2. The ventilation apparatus of claim 1, wherein the bypass duct is branched from a first side surface of the indoor air inlet guide duct.

3. The ventilation apparatus of claim 2, wherein a total heat exchange outlet is formed on a second side surface of the indoor air inlet guide duct, and
    wherein the ventilation apparatus further comprises a total heat exchange damper located at the total heat exchange outlet, the total heat exchange damper being configured to selectively open and close the total heat exchange outlet such that the indoor air inlet guide duct and the indoor air inlet space selectively communicate with each other.

4. The ventilation apparatus of claim 2, wherein the bypass duct is bent along an upper surface of the partition and an inner edge of the housing, the bypass duct being in communication with the indoor air outlet.

5. The ventilation apparatus of claim 4, wherein the bypass duct includes an inlet, and
    wherein the ventilation apparatus further comprises a bypass damper located at the inlet of the bypass duct.

6. The ventilation apparatus of claim 2, wherein the outdoor air inlet is in communication with the outdoor air inlet space,
    wherein the outdoor air outlet is in communication with an upper surface of the outdoor air discharge guide duct,
    wherein the indoor air inlet is in communication with an upper surface of the indoor air inlet guide duct, and
    wherein the indoor air outlet is in communication with an upper surface of the indoor air discharge guide duct.

7. The ventilation apparatus of claim 1, further comprising:
    a plurality of duct flanges on an upper surface of the housing; and
    a plurality of air ducts connected to the plurality of duct flanges, each of the air ducts extending from the housing.

8. The ventilation apparatus of claim 7, wherein the plurality of duct flanges comprises:
    an outdoor air inlet flange located at the outdoor air inlet;
    an outdoor air discharge flange located at the outdoor air outlet;
    an indoor air inlet flange located at the indoor air inlet; and
    an indoor air discharge flange located at the indoor air outlet.

9. The ventilation apparatus of claim 8, wherein the plurality of air ducts comprises:
    an outdoor air inlet duct connected to the outdoor air inlet flange;
    an outdoor air discharge duct connected to the outdoor air discharge flange;
    an indoor air inlet duct connected to the indoor air inlet flange; and
    an indoor air discharge duct connected to the indoor air discharge flange.

10. The ventilation apparatus of claim 1, wherein the partition includes:
    an air conditioning inlet configured to connect the indoor air inlet guide duct and the first space; and
    an air conditioning outlet configured to connect the outdoor air discharge guide duct and the second space, and
    wherein the ventilation apparatus further comprises:
    an air conditioning inlet damper located at the air conditioning inlet; and
    an air conditioning outlet damper located at the air conditioning outlet.

11. The ventilation apparatus of claim 1, wherein a total heat exchange outlet is formed on a side surface of the indoor air inlet guide duct, and
    wherein the ventilation apparatus further comprises a total heat exchange damper located at the total heat exchange outlet, the total heat exchange damper being configured to selectively open and close the total heat exchange outlet such that the indoor air inlet guide duct and the indoor air inlet space selectively communicate with each other.

12. The ventilation apparatus of claim 1, further comprising at least one of a HEPA filter and a pre-filter located between a side surface of the total heat exchange element and the outdoor air inlet space.

13. The ventilation apparatus of claim 1, wherein the housing includes:
an upper housing having a lower surface; and
a lower housing having an upper surface,
wherein the lower surface of the upper housing and the upper surface of the lower housing define the partition dividing the inner space of the housing.

14. The ventilation apparatus of claim 13, further comprising a connection unit to connect the upper housing to the lower housing at outer surfaces thereof.

15. A ventilation apparatus comprising:
a housing defining an inner space, the housing having an outdoor air inlet, an outdoor air outlet, an indoor air inlet, and an indoor air outlet;
a plurality of air ducts extending from the housing;
a partition configured to divide the inner space of the housing into a ventilation space and an air conditioning space, the partition having an air conditioning inlet and an air conditioning outlet;
a total heat exchange element located in the ventilation space, the total heat exchange element having four side edges respectively disposed to face four side surfaces of the housing;
four partition walls configured to respectively connect the four side edges of the total heat exchange element and the four side surfaces of the housing to partition the ventilation space, except for a space for the total heat exchange element, into an outdoor air inlet space, an outdoor air discharge space, an indoor air inlet space, and an indoor air discharge space;
an outdoor air discharge guide duct disposed in the outdoor air discharge space;
an indoor air inlet guide duct disposed in the indoor air inlet space;
an indoor air discharge guide duct disposed in the indoor air discharge space;
a suction fan disposed in the outdoor air discharge space, the suction fan being configured to draw outdoor air through the outdoor air inlet;
an exhaust fan disposed in the indoor air discharge space, the exhaust fan being configured to draw indoor air through the indoor air inlet;
a bypass duct branching from indoor air inlet guide duct, the bypass duct being configured to bypass the total heat exchange element, the bypass duct extending to the indoor air discharge space;
a heat exchanger located in the air conditioning space; and
an air conditioning fan located in the air conditioning space.

16. The ventilation apparatus of claim 15, wherein the plurality of air ducts comprises:
an outdoor air inlet duct connected to the outdoor air inlet space;
an outdoor air discharge duct connected to the outdoor air discharge space;
an indoor air inlet duct connected to the indoor air inlet space; and
an indoor air discharge duct connected to the indoor air discharge space.

17. The ventilation apparatus of claim 16, wherein the bypass duct is branched from a first side surface of the indoor air inlet guide duct.

18. The ventilation apparatus of claim 15, further comprising at least one of a HEPA filter and a pre-filter located between a side surface of the total heat exchange element and the outdoor air inlet space.

19. The ventilation apparatus of claim 15, wherein the housing includes:
an upper housing having a lower surface; and
a lower housing having an upper surface,
wherein the lower surface of the upper housing and the upper surface of the lower housing define the partition dividing the inner space of the housing.

* * * * *